United States Patent
Ennis

(10) Patent No.: US 8,028,628 B2
(45) Date of Patent: Oct. 4, 2011

(54) ROLLER ASSEMBLY CALL UP MECHANISM FOR A VEHICLE WASH CONVEYOR

(76) Inventor: G. Thomas Ennis, Inglewood, CA (US)

( * ) Notice: Subject to any disclaimer, the term of this patent is extended or adjusted under 35 U.S.C. 154(b) by 207 days.

(21) Appl. No.: 12/475,635

(22) Filed: Jun. 1, 2009

(65) Prior Publication Data

US 2010/0300323 A1    Dec. 2, 2010

(51) Int. Cl.
  *B61B 10/04* (2006.01)
  *B60S 3/06* (2006.01)
(52) U.S. Cl. ............... 104/172.3; 198/732; 104/162
(58) Field of Classification Search .......... 15/53.3, 15/DIG. 2; 104/139, 140, 162, 172.1, 172.3; 198/728, 731, 732
See application file for complete search history.

(56) References Cited

U.S. PATENT DOCUMENTS

| 4,715,287 A | 12/1987 | Wentworth et al. |
| 4,864,936 A | 9/1989 | Rietsch, Jr. |
| 4,873,929 A | 10/1989 | Witecki |
| 6,186,073 B1 | 2/2001 | Reitsch, Jr. |
| 7,243,605 B1 | 7/2007 | Belanger et al. |

OTHER PUBLICATIONS

Belanger, Inc., "DuraTrans XD", http://www.belangerinc.com/duratrans-xd, 2 pages.

*Primary Examiner* — S. Joseph Morano
*Assistant Examiner* — Zachary Kuhfuss
(74) *Attorney, Agent, or Firm* — Mattingly & Malur, P.C.

(57) ABSTRACT

A roller assembly call up mechanism for a vehicle wash conveyor having an endless chain with a plurality of spaced roller assemblies attached thereto for pushing a vehicle along a slotted track, is located below the track and includes a power cylinder, a crank arm connected to the power cylinder and an axle connected to the crank arm for rotation with the axle. A ramp in the form of a pair of spaced forks is connected to the axle for rotation therewith. A slotted link is pivotally connected at one end to the ramp and at an opposite end to the entrance trap door whereby when the power cylinder is actuated the ramp and the trap door are pivoted upwardly.

6 Claims, 5 Drawing Sheets

ROLLER ASSEMBLY CALL UP MECHANISM FOR A VEHICLE WASH CONVEYOR

BACKGROUND OF THE INVENTION

1. Field of the Invention

The present invention relates to an improved vehicle washing apparatus and, more particularly, to a vehicle washing apparatus having a conveyor with an improved roller assembly call up mechanism which includes an anti-jam feature.

2. Description of the Related Art

Various prior art vehicle washing installations and systems have heretofore been known and are in widespread use. The typical vehicle washing system includes a wash bay having a floor in which a conveyor is mounted for moving the vehicle through the installation and a series of power driven brushes and scrubber curtains are utilized to clean the vehicle under a drenching spray of water and cleaning agent. The washed vehicle is then given a drenching spray of clean rinse water and is dried.

A well known prior art conveyor is of the over and under type which utilizes an endless conveyor chain having a plurality of spaced roller assemblies attached along the length thereof. The endless chain typically extends around a three track structure comprised of a slotted upper track, an intermediate track and a lower track. The slotted upper track supports a vehicle such as a car. When the car advances on to the upper track, pusher rollers from a roller assembly are needed so a forked ramp is provided which is raised from the intermediate track to intercept and guide the pusher rollers through an opening roller assembly onto the slotted upper track along which the car tires roll. The pusher rollers then engage a tire of the vehicle to push the car through the washing installation. The slotted upper track accommodates the tire of a vehicle being washed and also provides a travel path for the pusher rollers which are selected at an appropriate time. The intermediate level track provides the forward track for the idle rollers of the roller assemblies as well as for unselected roller assemblies where the pusher rollers have not been ramped up to the slotted upper track and the lower track provides a return track for the roller assemblies.

A typical prior art over and under conveyor 10 is illustrated in FIGS. 1 and 2. The conveyor 10 includes a slotted upper track 12, an intermediate track 14 and a lower track 16.

The conveyor includes an endless chain 18 having a plurality of spaced roller assemblies 20 connected thereto. Each of the roller assemblies 20 has a pair of idler rollers 22 at its forward end and two pairs of pusher or tire engaging rollers 24 at its back end. The pusher rollers 24 engage the back of a tire 26 of a vehicle to push the vehicle along the slotted upper track of the conveyor in the direction indicated by the arrow A.

The conveyor is provided with an entrance trap door 28 at an entrance end thereof and with an exit trap door 30 at an exit end thereof.

A roller call up mechanism, generally indicated by the numeral 34, is provided at the front entrance end of the conveyor to move the pusher rollers 24 from a down position on the intermediate track to a raised tire engaging position on the slotted upper track to engage the tire of a vehicle after the vehicle has moved onto the conveyor.

The call up mechanism 34 is shown in greater detail in FIG. 2 and includes a power cylinder 36 having a rod pivotally connected to the crank arm 38 which in turn in fixedly secured to an outer end of an axle 40 which extends parallel to the slotted track in a direction perpendicular to the length thereof. A pair of spaced forks 42 are fixedly secured to the axle 40 for rotation therewith and form a ramp for moving the pusher rollers 24 up to the slotted upper track.

In operation of the typical prior art conveyor, when a vehicle has moved onto the slotted upper track of the conveyor, a signal is sent either manually by a call up button or automatically by a pressure sensing switch to the roller call up mechanism. This in turn activates the power cylinder 36 forwardly whereby crank arm 38 is rotated to rotate the axle 40. When the axle 40 is rotated, the forks 42 are raised upwardly. As a roller assembly is moved forwardly the pusher rollers engage the forks and are moved upwardly to push the trap door 28 open and to ride along the top of the slotted upper track to engage the back of a tire. The pusher rollers then move the vehicle down the track until reaching the end of the conveyor track whereupon the pusher rollers open the exit trap door 30 and drop back down to the lower track and loop back until a signal is again given causing the cycle of roller call up to start over again.

A problem with this type of this prior art conveyor is that if a car wheel is on top of the entrance trap door at the time the pusher rollers are ramped up by the forks, the rollers start to come up but stop below the trap door and jams up before emerging onto the slotted upper track. This sudden stop and jam up can cause serious damage to the conveyor chain and other components of the conveyor system. Therefore there is a need for an anti-jam device for the roller call up mechanism.

SUMMARY OF THE INVENTION

It is an object of the present invention to provide a roller assembly call up mechanism for a vehicle wash conveyor which has an anti-jam feature which prevents the pusher rollers of the roller assembly from proceeding up a ramp and jamming against the entrance trap door if the trap door is blocked.

Another object of the present invention is to provide a roller assembly call up mechanism for a vehicle wash conveyor which utilizes a slotted link to directly connect the forks of a ramp to the entrance trap door to prevent the forks from being raised when the trap door is blocked.

The present invention achieves the above and other objects by providing a roller assembly call up mechanism for a vehicle wash conveyor having an endless chain with a plurality of spaced roller assemblies attached thereto for pushing a vehicle along a slotted track by engaging a tire wherein the conveyor has a trap door at an entrance end for tire engaging rollers of the roller assemblies to enter the slotted track. The roller assembly call up mechanism is located below the slotted track and includes a power cylinder, a crank arm connected to the power cylinder and an axle connected to the crank arm for rotation therewith with the axle extending parallel to the slotted track in a direction perpendicular to the length thereof. A ramp is connected to the axle for rotation therewith and normally extends generally parallel to the slotted track in a direction lengthwise thereof and a link is pivotally connected at one end to the ramp and at an opposite end to the entrance trap door whereby when the power cylinder is actuated, the ramp and the trap door are pivoted upwardly.

The link may be constructed of a bar having an elongated slot at the end connected to the ramp and the bar is connected to the ramp by a pin extending outwardly from one side thereof which is pivotally and slidably engaged in the slot. The ramp may be constructed of two spaced forks and a link may be connected to each of the forks.

These, together with other objects and advantages which will be subsequently apparent, reside in the details of construction and operation as more fully described in claims

DETAILED DESCRIPTION OF THE PREFERRED EMBODIMENTS

Figure 1:
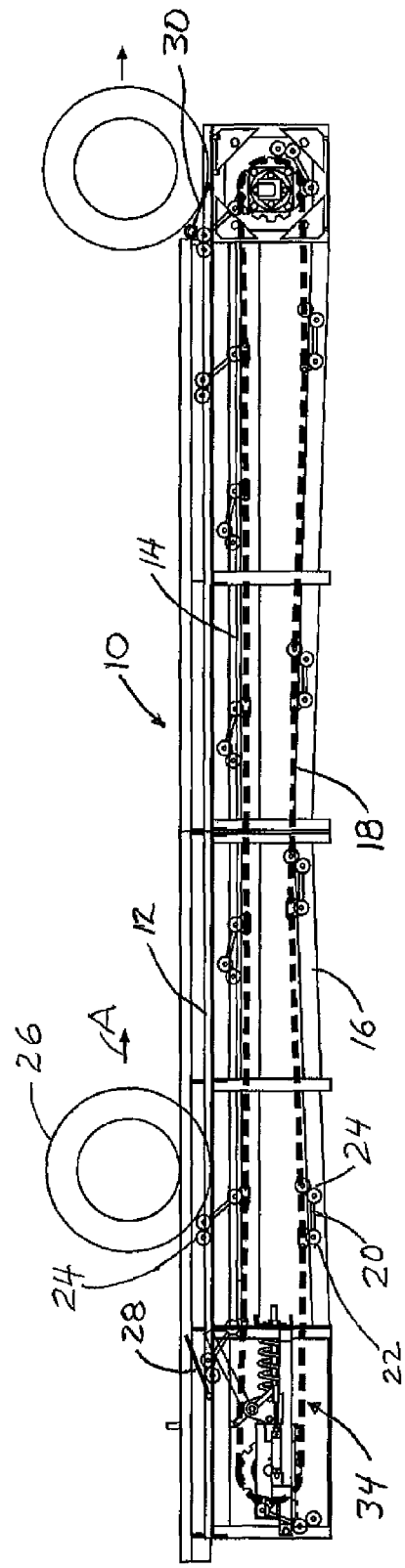
FIG. 1 is a schematic side elevational view of a prior art over and under conveyor for a vehicle washing installation.
Figure 2:
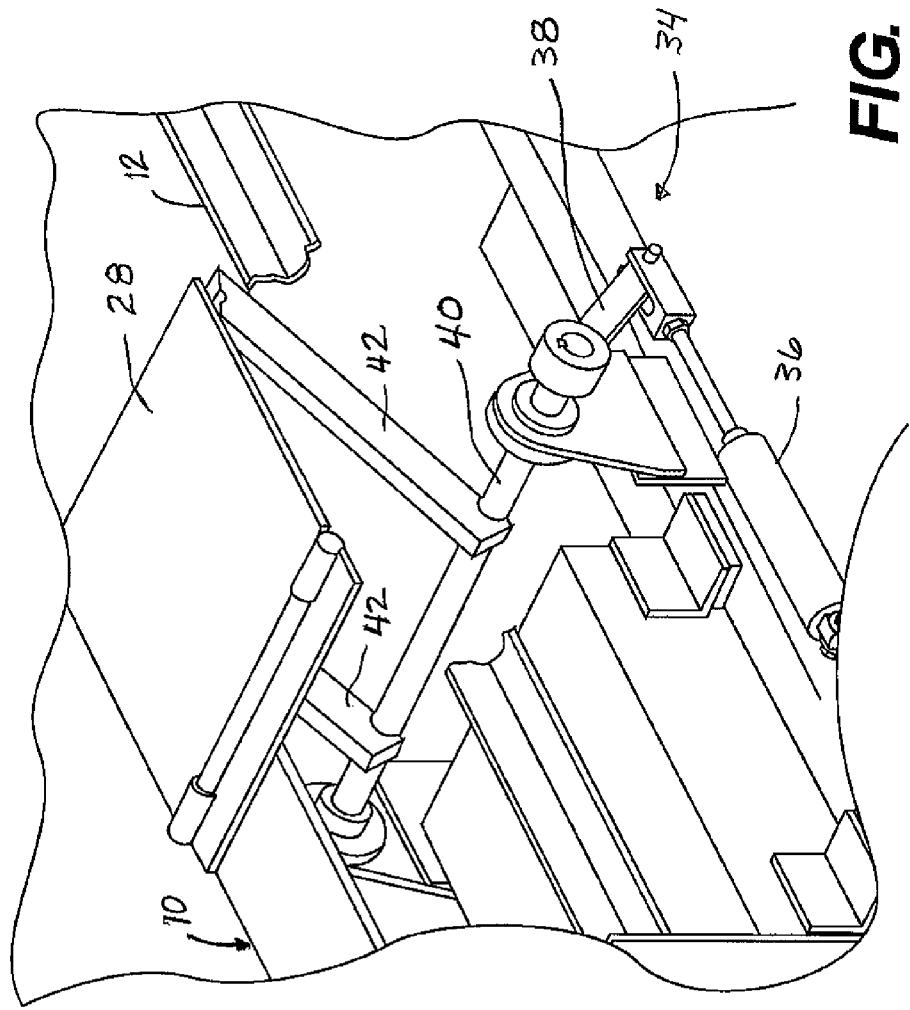
FIG. 2 is an enlarged view of a call up mechanism for pusher rollers of a roller assembly of the prior art conveyor of FIG. 1.
Figure 3:
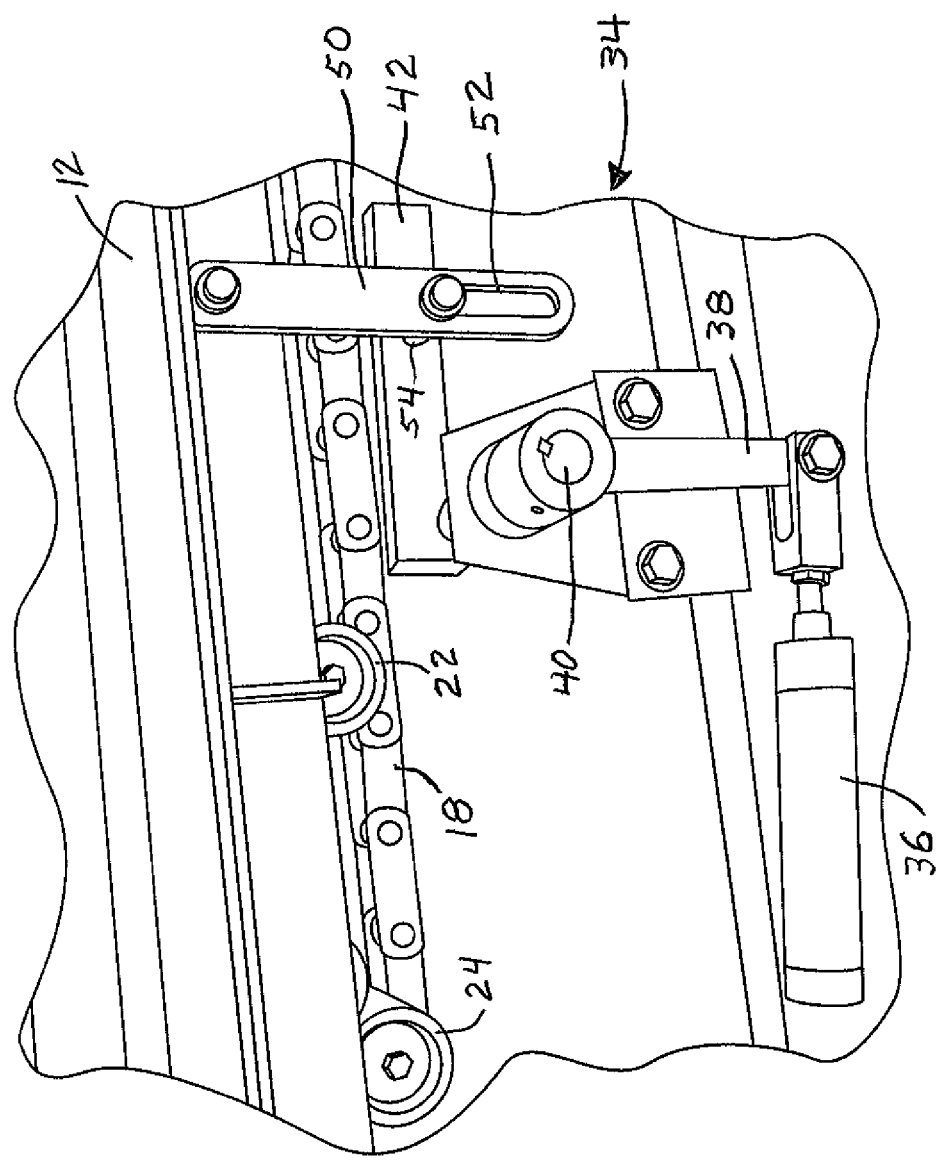
FIG. 3 is an enlarged perspective view of the roller assembly call up mechanism of the present invention showing a slotted link connected to both a fork of a ramp and an entrance trap door of the conveyor.
Figure 4:
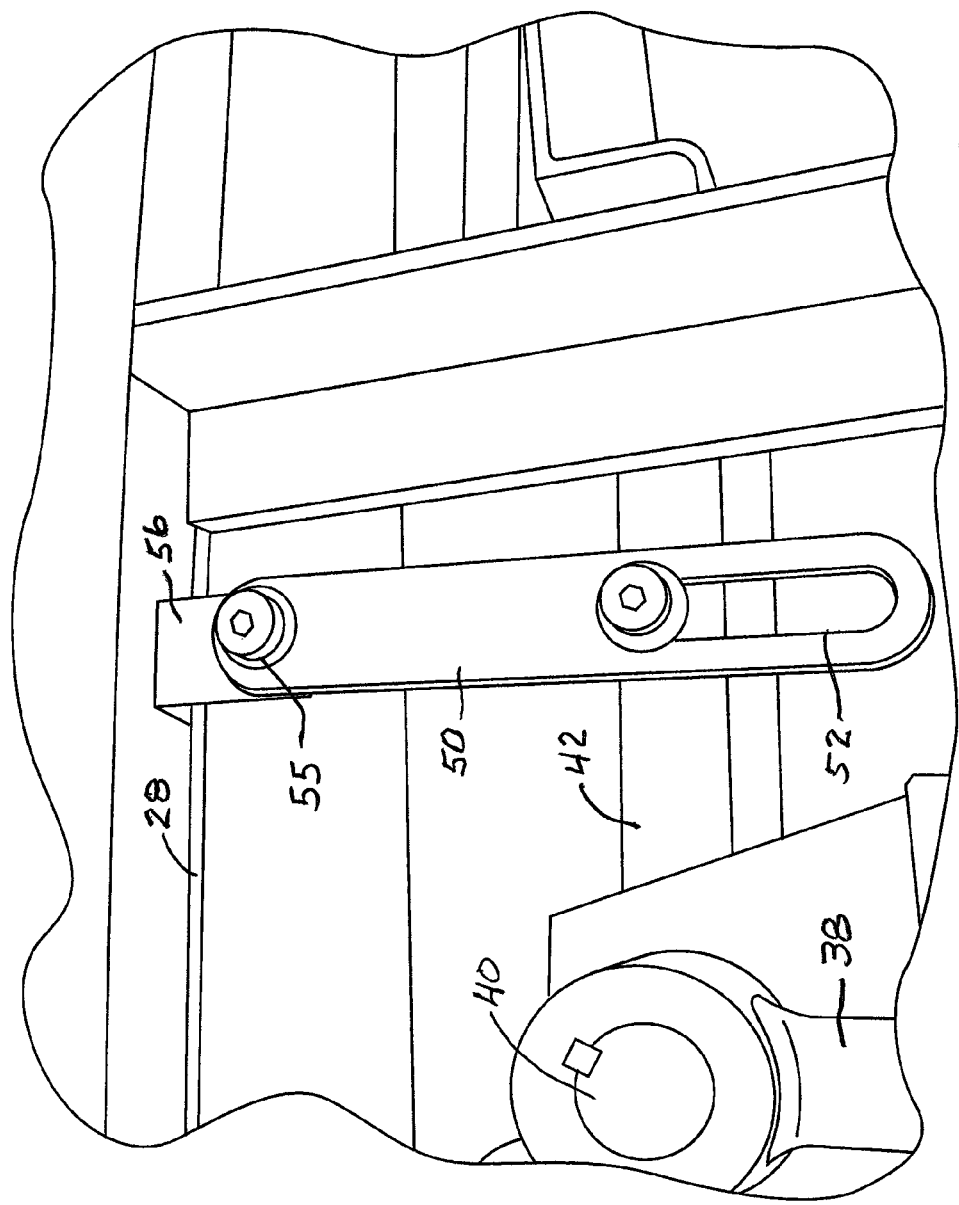
FIG. 4 is a further enlarged view of the roller call up mechanism of the present invention illustrating the slotted link attached to both a ramp fork and a bracket mounted on the side of the entrance trap door.
Figure 5:
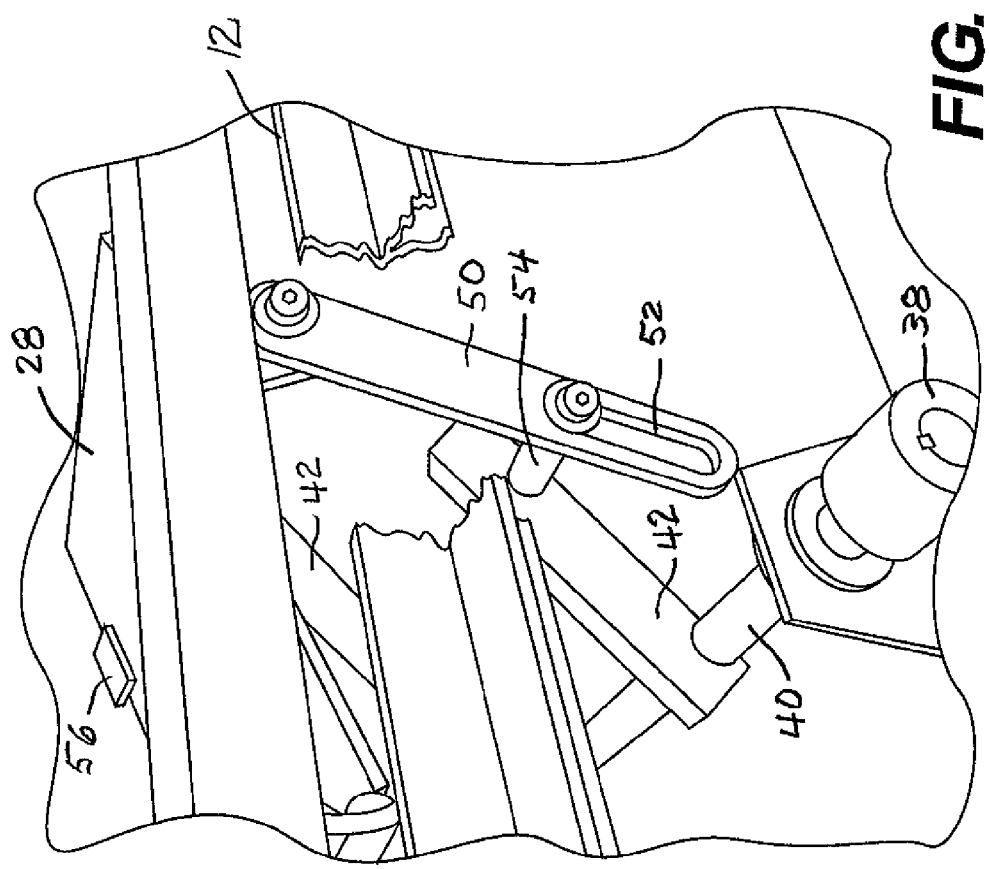
FIG. 5 is an enlarged view of the roller call up mechanism of the present invention showing the ramp forks elevated and the entrance trap door opened.

Referring the drawings, the roller assembly call up mechanism according the present invention is shown in FIGS. 3, 4 and 5. Where applicable, the numerals used to identify the parts of the present invention are the same as the numerals used to identify similar parts in the prior art apparatus shown in FIGS. 1 and 2.

As shown in FIG. 3, the present invention includes a power cylinder 36 having its rod pivotally connected by a clevis to a crank arm 38 which in turn is fixedly secured to the end of an axle 40 which extends underneath the conveyor slotted upper track 12 and is parallel thereto in a horizontal plane in a direction perpendicular to the length of the slotted track.

A pair of spaced forks 42 are fixedly mounted to the axle 40 for rotation therewith and constitute a ramp for moving or ramping up the pusher rollers 24 of a roller assembly 20 so that the pusher rollers push open the trap door 28 and move up to engage the top of the slotted upper track 12. As the pusher rollers move forwardly they engage a tire 26 of a vehicle positioned on the slotted upper track.

At least one of the forks 42 has a pin 54 extending outwardly therefrom for pivotal engagement with an elongated slot 52 formed in the lower end of a link 50 which, as shown, is in the shape of a bar. The upper or opposite end of the link 50 is pivotally attached to a pin 55 extending outwardly from a bracket 56 mounted on one side adjacent the front end of the entrance trap door 28. A similar slotted link in the form of a bar 50 is mounted to the other fork and is also pivotally connected to a pin extending outwardly from the bracket 56 mounted to the top adjacent the front end of the other side of the entrance trap door 28 as shown in FIG. 5.

In operation of the roller assembly call up mechanism of the present invention, when the power cylinder 36 is activated to rotate the crank arm 38 and the axle 40, the ramps 42 acting through the pins 54 push the links 50 upwardly which, in turn, causes the entrance trap door 28 to normally also be raised to permit the pusher rollers of a roller assembly to pass up through the slotted upper track 12 and proceed down the track to engage the tire of a vehicle.

If the entrance trap door 28 is blocked such as by having a tire of a vehicle parked directly thereon, the forks 42 will not rise up when pushed by the air cylinder due to the fact that the link connecting the door above and the fork below will maintain the fork locked in the down position no matter what force the air cylinder exerts on the forks. This prevents the rollers from jamming between the blocked door and the forks.

The elongated slot 52 at the lower end of the link 50 provides a safety feature in that if something is in the way or is blocking the trap door from returning to its normal closed position, as the forks are lowered, the pin 54 will simply slide in the slot 52 and not force the entrance trap door downwardly to a closed position. This is particularly helpful in preventing the fingers or toes of a person which may be in the way from injury when the door attempts to close.

Numerous other modifications and adaptations of the present invention will be apparent to those skilled in the art and thus, it is intended by the following claims, to cover all such adaptations which fall within the true spirit and scope of the invention.

What is claimed is:

1. A roller assembly call up mechanism for a vehicle wash conveyer having an endless chain with a plurality of roller assemblies attached thereto for pushing a vehicle along a slotted track by engaging a tire, the conveyor having a trap door at an entrance end for tire engaging rollers of the roller assemblies to enter the slotted track, the roller assembly call up mechanism being located below the slotted track and comprising:
    a power cylinder;
    a crank arm connected to said power cylinder;
    an axle connected to said crank arm for rotation therewith and extending parallel to the slotted track in a direction perpendicular to the length thereof;
    a ramp connected to said axle for rotation therewith and normally extending generally parallel to the slotted track in a direction lengthwise thereof; and
    a link pivotally connected at one end to said ramp and at an opposite end to the trap door whereby when the power cylinder is actuated, the ramp and the trap door are pivoted upwardly.

2. The roller assembly call up mechanism of claim 1 wherein said link comprises a bar having an elongated slot at said one end, and said bar is connected to said ramp by a pin extending outwardly from one side of said ramp which is pivotally and slidably engaged in said slot.

3. The roller assembly call up mechanism of claim 1 wherein said ramp comprises two spaced forks and said link is connected to one of said forks.

4. The roller assembly call up mechanism of claim 3 which further comprises a pin attached to said one of said forks and extending outwardly therefrom and wherein said link is pivotally connected to said pin.

5. The roller assembly call up mechanism of claim 1 which comprises a pair of links, with one of said links being connected to one side of the ramp and one side of the trap door and the other of said links being connected to an opposite side of the ramp and an opposite side of the trap door.

6. A roller assembly call up mechanism for a vehicle wash conveyor having an endless chain with a plurality of roller assemblies attached thereto for pushing a vehicle along a slotting track by engaging a tire, the conveyor having a trap door at an entrance end for tire engaging rollers of the roller assemblies to enter the slotted track, the roller assembly call up mechanism being located below the slotted track and comprising:
    a power cylinder;
    a crank arm connected to said power cylinder;

an axle connected to said crank arm for rotation therewith and extending parallel to the slotted track in a direction perpendicular to the length thereof;

a pair of spaced forks comprising ramp connected to said axle for rotation therewith and normally extending generally parallel to the slotted track in a direction lengthwise thereof;

a pin attached to one of said forks and extending outwardly therefrom; and a link having a slot at one end thereof, said pin being pivotally and slidably engaged in said slot to connect said one end of said link to said ramp and wherein an opposite end of said link is pivotally connected to said trap door whereby when the power cylinder is actuated the ramp and the trap door are pivoted upwardly.

* * * * *